Dec. 28, 1937. J. C. CONRAD 2,103,235
INSTRUMENT FOR DETERMINING THE DEVIATION OF BORE HOLES
Filed Aug. 17, 1936 4 Sheets-Sheet 3
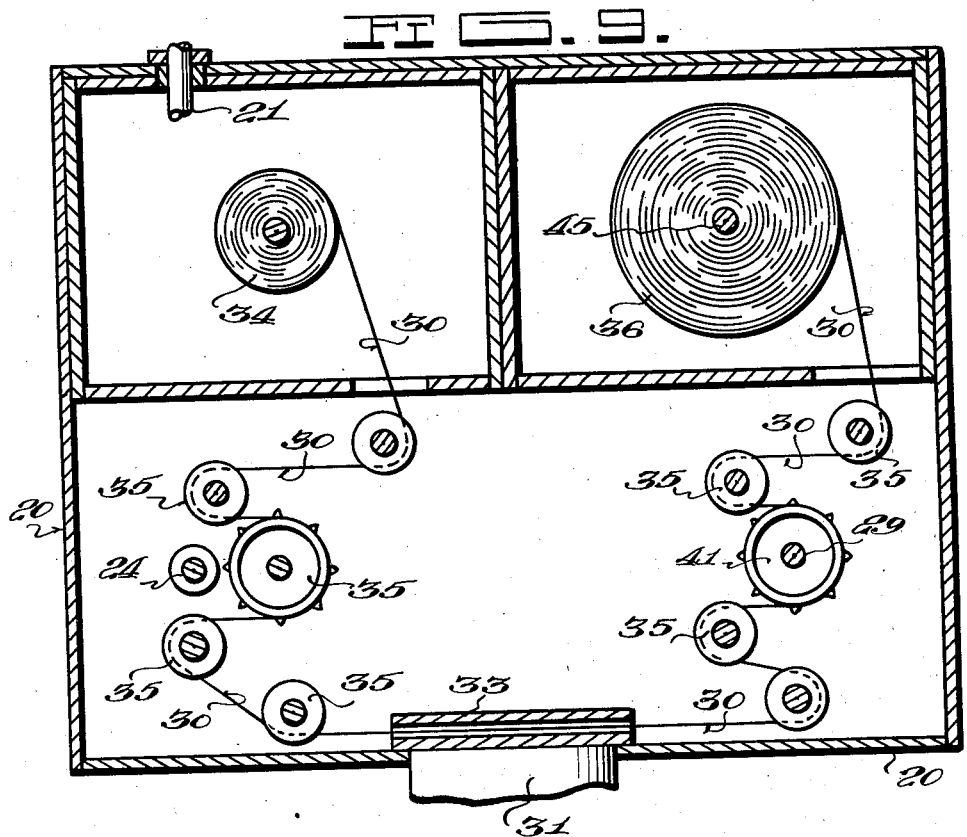
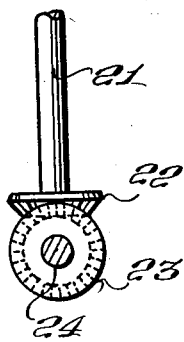
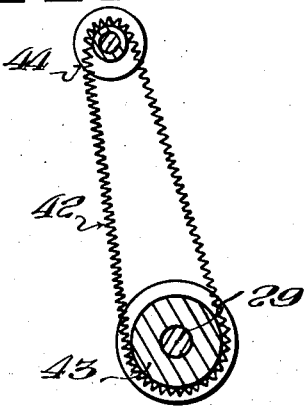
Joshua C. Conrad
INVENTOR.
BY
ATTORNEY.

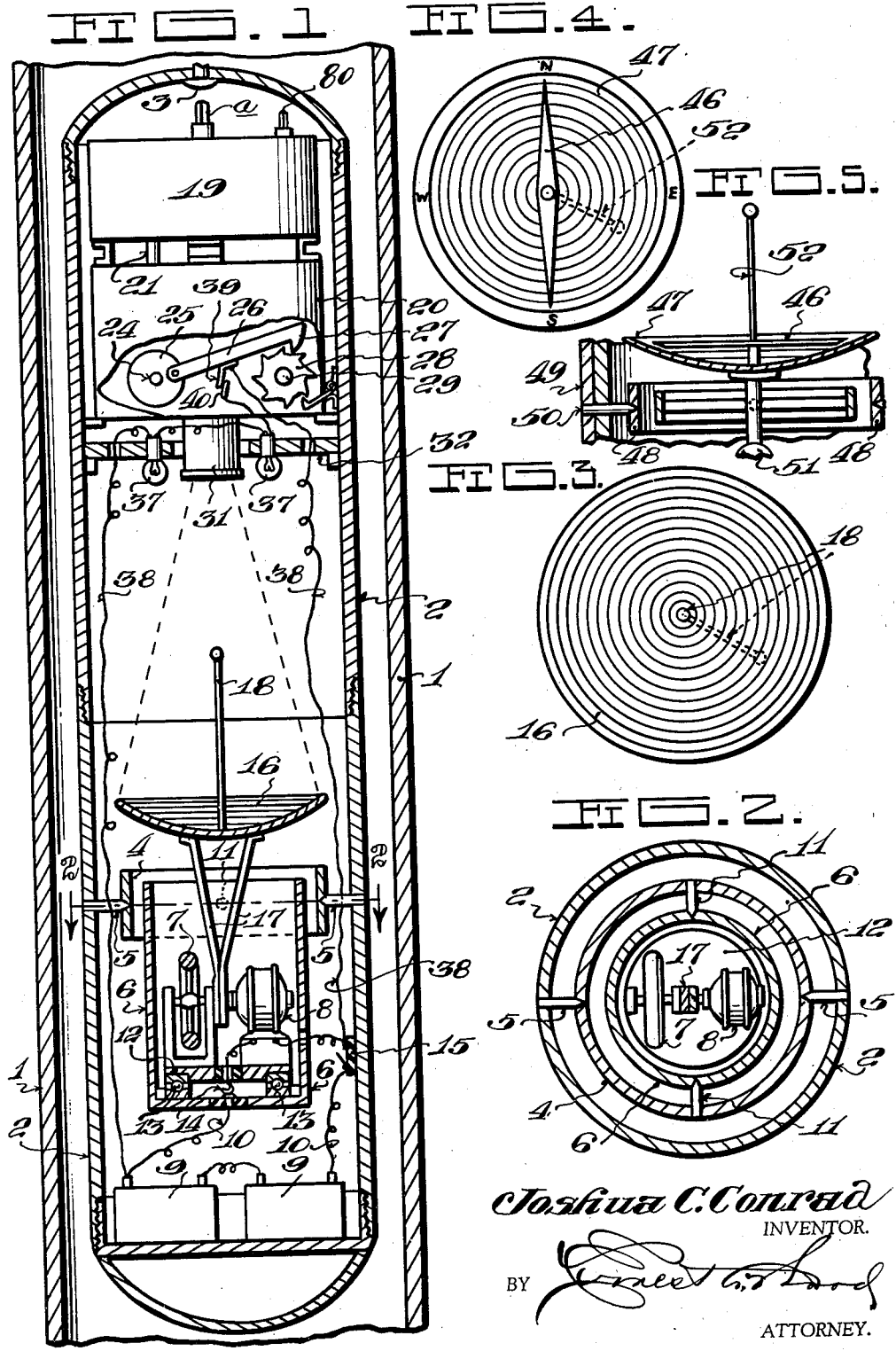

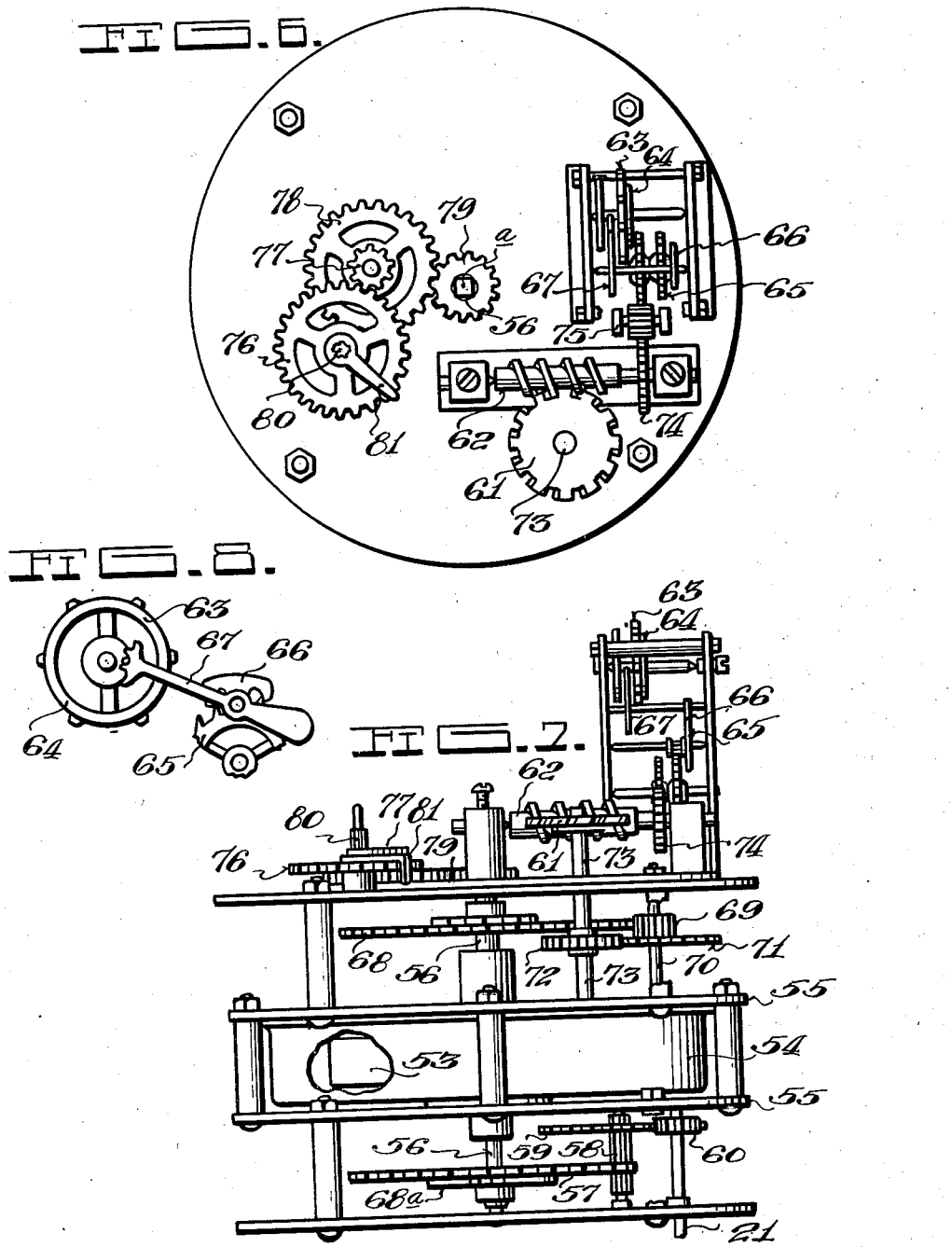

Dec. 28, 1937. J. C. CONRAD 2,103,235
INSTRUMENT FOR DETERMINING THE DEVIATION OF BORE HOLES
Filed Aug. 17, 1936 4 Sheets-Sheet 4
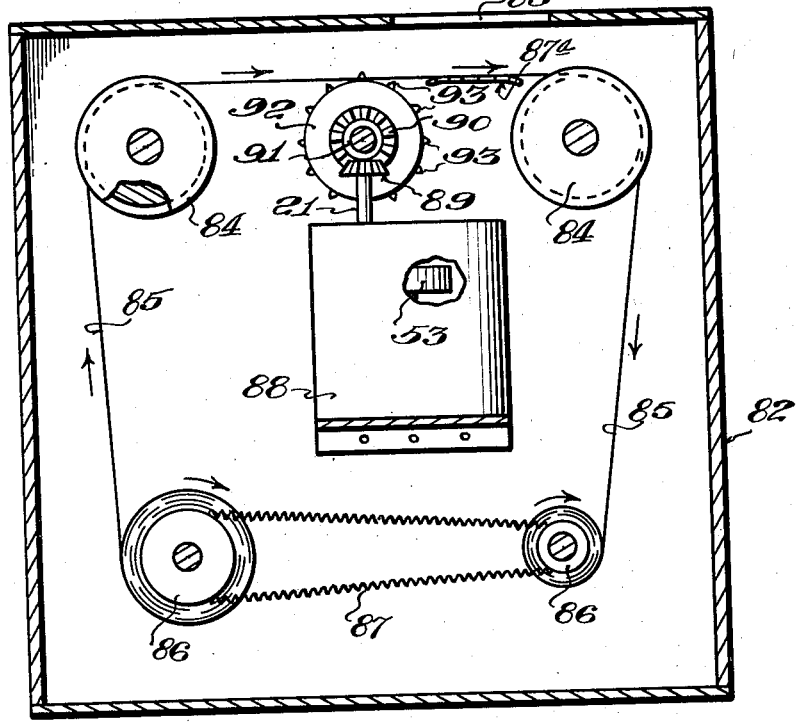
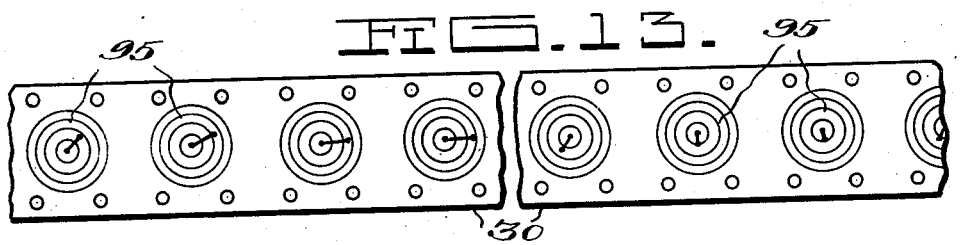
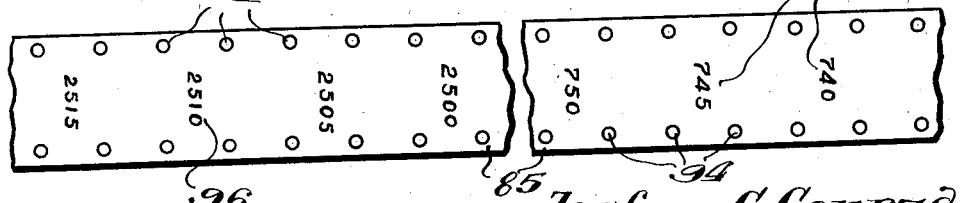
Joshua C. Conrad
INVENTOR.
BY
ATTORNEY.

Patented Dec. 28, 1937

2,103,235

UNITED STATES PATENT OFFICE 2,103,235

INSTRUMENT FOR DETERMINING THE DEVIATION OF BORE HOLES

Joshua C. Conrad, Oklahoma City, Okla.

Application August 17, 1936, Serial No. 96,448

6 Claims. (Cl. 33—205.5)

This invention relates to instruments for surveying wells and it has particular reference to apparatus designed for determining the degree of slant or deviation from the vertical of the bore in oil and other wells.

The principal object of the invention is to provide an instrument having self enclosed operating means adapted to be suspended in a bore hole and provided with means whereby one unit thereof is arranged to maintain a given orientation, said latter means being further arranged to remain vertical at all times regardless of the drift of the bore hole. Moreover, the invention seeks to photographically record periodically the angle of the bore hole from the vertical registered upon a calibrated element carried by said oriented means.

Another object of the invention is to provide an instrument having a calibrated means arranged to be suspended vertically at all times in a bore hole and having mounted therein relative to said calibrated means a compass and means for photographically recording on a moving film both the deviation from the vertical of the instrument as a whole and the orientation of the instrument relative to a fixed orientation.

Another object of the invention is to provide surface means operating concurrently with the surveying instrument for producing a depth record for subsequent comparison with the photographic film for calculating the depths at which deviation and slants occur.

Still another object of the invention is to provide an improved clock mechanism having gear means whereby a high degree of torque may be transmitted to operate the photographic means.

Yet another object of the invention is to provide means connected to said photographic means whereby the deviation of the bore hole from the vertical may be intermittently recorded at predetermined time intervals.

With the foregoing objects as paramount, the invention has particular reference to its salient features of construction and arrangement of parts, to become manifest as the description proceeds, taken in connection with the accompanying drawings, wherein:—

Figure 1 is a vertical section through the invention.

Figure 2 is a transverse section on lines 2—2 on Figure 1.

Figure 3 is a plan view of the calibrated concave carried by the gyroscopic element shown in Figures 1 and 2.

Figure 4 is a plan view of a modified form on the device for maintaining a given orientation of the calibrated concave.

Figure 5 is a fragmentary elevation of the modified form of concave and its mounting as shown in Figure 1.

Figure 6 is a plan view of the spring driven power unit for operating the photographic reproducing device of the invention.

Figure 7 is a side elevation.

Figure 8 is a fragmentary detail of the escapement control of the device shown in Figures 6 and 7.

Figure 9 shows the camera or photographic device in enlarged scale, illustrating schematically the travel of the film.

Figure 10 is a detail of the driven shaft from the spring motor to the film moving shaft.

Figure 11 shows a detail of the friction drive between the film advancing device and storage reel.

Figure 12 is a vertical section through the housing of the depth or footage indicator, showing more or less diagrammatically the depth recording scale and operating means.

Figure 13 is a section of the photographic film with resultant exposures at various depths in the hole, and Figure 14 is a section of depth scale.

Continuing with a more detailed description of the drawings, reference is primarily made to Figure 1 in which 1 designates a well casing in which is suspended for continuous downward advancement an elongated housing 2 in sections. The housing 2 is lowered in the casing by a cable or other means connected to its upper end at 3.

It is the object to provide in the housing, a means unaffected by the slant or deviation of the well or bore hole from the vertical, or in other words, gyroscopic or compass means which will maintain a given orientation, with means constrained to follow the angular variations of the hole from its intended angle relative to the surface for photographically recording upon a moving and light sensitive film the varying degrees of angular displacement of the first means with respect to the photographic means, which will be a definite measure of the deviation from the vertical, for subsequent reading and determination.

Accordingly, the gyroscopic or compass means referred to is shown in Figure 1 as being disposed in the lower portion of housing or casing 2 and is comprised of a gimbal ring 4, which is turnable on an axis 5 in one direction and which supports or suspends a casing 6, the latter in turn enclosing a gyroscope 7, operated by a motor 8. The motor 8 is operated from a source 9, through wires 10, the source being, in the present case, batteries of the dry cell or storage battery type. The supporting means for the casing 6 is comprised of needle bearings 11, similar to pivots 5 to enable the casing 6 to oscillate and orient itself to the vertical at all times.

The gyroscope 7 and its operating motor 8 are both mounted upon a table 12 which is revolvably separated from the base of the casing 6, upon which it sets, by means of a ball bearing race 13, contact by one of the battery wires 10 being made through a spring contact 14, through a suitable insulation, shown in Figure 1. The other wire 10 is connected to a suitable switch 15, thence to the motor 8 as shown.

Thus the casing 6 is suspended within but is independently movable with respect to the housing 2 and affords a mounting for the calibrated concave 16, the latter being connected to the gyroscope means by the arms 17 and is consequently movable therewith.

Extending upwardly from the center of the concave 16 is a pin 18 which serves as an indicating standard, due to the fact that a photographic reproduction of the concave 16 either in its normal or central position or at a variety of positions, such as shown by the dotted lines in Figure 3, the position of the image of the pin on the film being the measure of error in the bore hole.

In the upper section of the housing 2 is a compartment 19 which encloses the spring motor shown in detail in Figures 6 to 8 inclusive and provides the power for operating the photographic means to be described presently.

Another compartment 20, shown in Figure 9 in detail, contains the photographic means and film control mechanism, which will be described prior to specific reference to the spring motor.

The driven shaft 21 of the spring motor depends from the compartment 19, into compartment 20 and as apparent in Figure 10 has a beveled gear 22 thereon. This gear enmeshes a similar gear 23, mounted on a shaft 24. Shaft 24 carries a disc 25 (Figure 1) to which is eccentrically connected an arm 26, which serves as a pawl or detent, its free end being shaped to provide a tooth 27, engageable with the teeth of the ratchet wheel 28, mounted on a shaft 29.

It is apparent that the rotation of the power shaft 21 is necessarily continuous at a given rate of speed. Consequently, movement of disc 25 and arm 26 is continuous. Accordingly, it is important to observe that the effective interim in the movement of the arm 26 is the period of dwell at the end of the cycle of the arm 26 relative to the ratchet 28, it being noted in Figure 1 that there is a space between the tooth 27 of the arm and one of the teeth of the ratchet 28. It is during the taking up of this space that the film 30 (Figure 9) is exposed to the object, namely, the calibrated concave 16, which occurs at each cycle of the disc 25 and arm 26.

The camera lens 31 is secured in the partition 32 and, as apparent in Figure 9, the film 30 is constrained to pass thereacross by means of a guide 33, after passing from a reel 34, over a series of rollers 35 to a winding reel 36 in a magazine separate from the magazine containing the reel 34.

It will be noted in Figure 1 that the partition 32 likewise carries a plurality of light bulbs 37 which are connected to the batteries 9 through wires 38. A spring contact 39 is carried by the arm 26 and as the arm 26 is moved forward this contact 39 engages a contact 40, connected with the light circuit 38 and lamps 37. Accordingly, the light sensitive film is exposed and an image of the calibrated concave 16 and its standard 18 is reproduced on the film 30.

As the arm 26 is moved rearwardly, the tooth 27 thereof engages one of the teeth of the ratchet 28, rotating the latter a predetermined extent comparative to the length of one frame of the film 30. At the same time, contact between 39 and 40 is broken. Accordingly, the light circuit 38 is broken.

As the arm 26 rotates the ratchet 28, shaft 29 is likewise rotated. A film guide roller 41 is mounted also on this shaft and as apparent in Figure 9, directs the film 30 onto the reel 36. However, to insure proper tension on the film 30, a spring belt 42 (Figure 11) surrounds an annularly grooved wheel 43 on shaft 29 and a similar wheel 44, mounted on shaft 45 (Figure 9) carrying the reel 36. Due to the difference in ratio between wheels 43 and 44, the reel 36 is caused to rotate at a higher speed than the ratchet wheel 28, to insure proper tension on the film 30, but the spring belt 42 will allow for slippage when the ratchet wheel is actuated.

Before describing the spring motor shown in Figures 6 to 8 inclusive, reference is here made to a modified form of self orienting means, shown in Figures 4 and 5. Instead of the gyroscopic means described in the foregoing, a compass pointer or needle 46 is disposed in the calibrated concave 47, which latter, around its outer edge is provided with conventional degree marks, as shown. As in the preceding case, the concave 47 is supported by a gimbal ring 48, suspended in the casing 49 by pivots 50.

A balancing weight 51 is suspended from the bottom of the concave 47 to maintain the indicating standard 52 in a vertical position at all times, while the compass needle 46 denotes on the film a change in orientation of the device as a whole from the initial starting point. The photographic means just described is mounted above the calibrated concave 47 in a manner similar to the preceding case in order to photographically reproduce the relative positions of the needle 46 and concave 47 for subsequent calculations for the determination of the slant of the bore hole from the vertical.

Referring now specifically to the spring motor shown in Figures 6 to 9, a spring 53 is wound in a barrel 54, disposed between plates 55. The spring imparts rotation to a center shaft 56, which is the spring winding shaft, having a squared end $a$. The spring applies torque to the driven shaft 21 through the center wheel 57, pinion 58, second wheel 59 and pinion 60 mounted directly on the shaft 21.

Control of the rate of the rotation of the driven shaft 21 is accomplished by the escapement mechanism shown in Figures 6 and 8 but the torque applied to the driven shaft is not appreciably diminished, by reason of the fact that through the medium of a worm gear 61 and worm 62, the only effect of the escapement mechanism upon the driven shaft 21 is to control its rate of rotation.

The escapement mechanism is of a conventional nature, being provided with a balance wheel 63, which however, unlike conventional balance wheels, is provided with a counter-balance 64.

The escape wheel 65, fork 66 and arm 67 are of conventional construction.

Connection between the spring 53 and the escapement mechanism is made through the center wheel 68, carrying a ratchet wheel 68a, to prevent reverse rotation of the wheels; through pinion 69 on shaft 70, wheel 71 on shaft 70 to pinion 72 on shaft 73. The worm gear 61 is mounted on this shaft 73 and has a ratio of approximately 28-1 with respect to the worm 62 with which it is engaged and which is under the control of the escapement mechanism through the medium of enmeshing pinions 74 and 75.

Should it be desired to predetermine the operating time of the spring motor, a wheel 76 is disposed at a point spaced from the escapement mechanism and whose teeth enmesh those of a pinion 77. The pinion 77 is mounted on the same shaft with a wheel 78, whose teeth, in turn enmesh those of a pinion 70 on the center shaft 56.

The shaft 80, carrying the wheel 76 protrudes through the compartment 19 (Figure 1) and likewise carries an arm 81. By lifting shaft 80, the arm 81 may be set at any position radially on the wheel 76 and will allow the same to revolve only a degree which may be predetermined by observation.

In order to ascertain the depth in the bore hole at which the deviation or slant occurs, the invention provides an indicator constructed according to Figure 12. The housing 82 has a hole 83 in its top. A pair of guide rolls 84 are mounted on parallel axes in the housing near the hole 83 and carry the web 85 as it is reeled off one or the other of the rolls 86. These latter rolls are preferably of different diameters and are connected together by a flexible spring belt 87 whereby to insure constant tension on the web 85, which is constructed of paper or a like material. A writing surface 87a is disposed under the web 85 to support the same and to enable the operator to manually record, at intervals, on the web, the number of joints of pipe or feet of cable lowered into the hole.

The means for moving the web 85 is similar to the spring motor employed for operating the film 30 at a constant rate of speed as explained previously. Accordingly, the elements of this motor are identified by the same reference characters as appear in Figures 1, 6 and 8.

The spring motor is mounted in the casing 88, the spring 53 driving the shaft 21, as in the preceding instance and at identically the same rate of speed. The gear 89, carried by the shaft 21, enmeshes a similar gear 90 on the shaft 91, the latter also carrying the drum 92 having annularly spaced rows of studs 93 thereon. These studs enter successively the apertures 94 (Fig. 14) in the edge of the paper web 85, thereby advancing the same at a predetermined rate and, as stated, at the same rate as the photographic film 30 moves in the surveying instrument as the latter is lowered in the bore hole.

An additional factor to be considered is the speed at which the surveying instrument is lowered in the hole, as this operation must be commensurate with the speed of travel of both, the photographic film and the depth scale or web 85. In other words, presuming that the exposures 95 are made at ten second intervals at a fixed rate of linear travel of the instrument, the distance between each exposure becomes known and this may be later calculated and determined as a complete observation by placing the film 30 and web 85 side by side in the relationship shown. The numbers 96, shown at intervals on the scale, designating depth in feet, the corresponding exposure on the film will indicate the condition of the bore at the level indicated on the web.

Manifestly, the construction shown is capable of considerable modification and such modification as is considered within the scope and meaning of the appended claims is also considered within the spirit and intent of the invention.

What is claimed is:—

1. An instrument for photographically indicating the deviation of bore holes from the vertical including means arranged to maintain a given orientation and carrying a calibrated element said element comprising a concave having a centrally disposed and upwardly extending pin, illuminating means, photographic means normally following the angle of said bore hole for recording on a moving film the angular positions of said pin with respect to said concave, whereby to determine the angular relationship between said bore hole and said first means.

2. An instrument for recording the slant and drift of a bore hole from the vertical including means maintained in fixed predetermined relation to the vertical, a calibrated means carried thereby, said calibrated means comprising a concaved disc, a pin affixed in the central portion of said disc and extending upwardly, and means following the bore hole for photographically recording periodically the position of said calibrated means.

3. An instrument for photographically recording the deviation of bore holes from the vertical including an elongated casing, means in the lower portion thereof for maintaining a given orientation, a concaved calibrated disc fixed to said latter means, and having a pin fixed in its center and extending therefrom, illuminating means, photographic means affected by the slant of said bore hole for periodically reproducing on a moving film the position of the image of said pin on said calibrated means and automatic means for operating said photographic means.

4. An instrument for recording within a bore hole the deviation thereof from the vertical comprising photographic means affected by the slant of said bore hole for reproducing on a moving film at predetermined time intervals the position of a second means unaffected by the slant of said bore hole said second means comprising a gyroscope, a calibrated concave oriented thereby, and means carried by said concave for subsequent determination of the variations in the relative positions of said photographic means and its object through its image on said film.

5. In an instrument for photographically recording the depth and deviation from the vertical of bore holes, a gyroscope, a calibrated concave supported thereon to be unaffected by the angle of the bore hole with respect to the vertical a pin affixed in the center of said concave photographic means constrained to follow the angle of the bore hole, means arranged to actuate a light sensitive moving film through said photographic means for periodically photographing said concave to reproduce thereon the position of said pin, means for operating said photographic means and surface means for disclosing by subsequent comparison the depth of the exposures of said photographic means.

6. In an instrument for recording the deviation from the vertical and the depth thereof in bore holes, photographic means arranged to be lowered in said bore hole and carrying light sensitive film, a gyroscope, a calibrated concave affixed thereon to be unaffected by the angle of said bore hole, and serving as an object for said photographic means a pin affixed centrally of said concave, means arranged for periodic illumination for exposing the light sensitive film whereby to obtain exposures of said object, and the image of said pin means for operating said photographic means and surface means operating concurrently with said photographic means for disclosing for subsequent comparison, the depth of the exposures on said light sensitive film.

JOSHUA C. CONRAD.